(12) United States Patent
Kono

(10) Patent No.: US 6,285,918 B1
(45) Date of Patent: Sep. 4, 2001

(54) WEIGHING AND PACKAGING SYSTEM

(75) Inventor: Katsuaki Kono, Shiga (JP)

(73) Assignee: Ishida Co., Ltd., Kyoto (JP)

( * ) Notice: Subject to any disclaimer, the term of this patent is extended or adjusted under 35 U.S.C. 154(b) by 0 days.

(21) Appl. No.: 09/366,668

(22) Filed: Aug. 3, 1999

(30) Foreign Application Priority Data

Aug. 4, 1998 (JP) .................................................. 10-233564

(51) Int. Cl.⁷ .................................................. G06F 17/00
(52) U.S. Cl. .............................................. 700/240; 53/502
(58) Field of Search ..................................... 700/213, 231, 700/240, 305, 3; 53/502, 51, 52; 177/245

(56) References Cited

U.S. PATENT DOCUMENTS

| | | | |
|---|---|---|---|
| 4,520,883 | * | 6/1985 | Fukuda ..................................... 177/1 |
| 4,587,630 | * | 5/1986 | Straton et al. ...................... 364/900 |
| 4,780,830 | | 10/1988 | Omi et al. . |
| 4,811,256 | * | 3/1989 | Yamada et al. ...................... 364/567 |
| 4,853,881 | * | 8/1989 | Yamada ............................... 364/567 |
| 5,753,867 | * | 5/1998 | Konishi et al. ................... 177/25.18 |

FOREIGN PATENT DOCUMENTS

0160512 A2   11/1985   (EP) .

* cited by examiner

*Primary Examiner*—Christopher P. Ellis
*Assistant Examiner*—Khoi H. Tran
(74) *Attorney, Agent, or Firm*—Hogan & Hartson, LLP

(57) ABSTRACT

A weighing and packaging system includes a weighing apparatus (1) for weighing an article (M) and discharging an article (M) having a predetermined weight, and a packaging apparatus (200) operatively associated with the weighing apparatus (1) for receiving the article (M) discharged from the weighing apparatus (1) and packaging the article (M). An override means (85) is provided for changing an operating condition of one of the weighing and packaging apparatuses (1,200) automatically when an operating condition of the other of the weighing and packaging apparatuses (1,200) is changed.

5 Claims, 9 Drawing Sheets

Fig.6

(a) 1ST OPERATING CONDITION 82a (FOR COMBINATION WEIGHER)

| CALL NO. | PRODUCT IDENTIFICATION | BAG NUMBER | NO. OF DISCHARGE | TARGET WEIGHT | VIBRATION STRENGTH | VIBRATION TIME | ... | DELAY TIME | MASTER/SLAVE |
|---|---|---|---|---|---|---|---|---|---|
| 001 | POTATOS | 60 | 1 | 50 | 30 | 500 | ... | 100msec | SLAVE |
| 002 | CANDIES | 80 | 1 | 100 | 40 | 600 | ... | 30msec | SLAVE |
| 003 | CHOCOLATES | 30 | 2 | 300 | 50 | 300 | ... | 50msec | MASTER |
| .. | .. | .. | .. | .. | .. | .. | ... | .. | .. |

(b) 2ND OPERATING CONDITION 82b (FOR BAGGING MACHINE)

| CALL NO. | PRODUCT IDENTIFICATION | BAG NUMBER | NO. OF DISCHARGE | BAG LENGTH | BAG WIDTH | SEALING TEMP. | SEALING TIME | ... | DELAY TIME | MASTER/SLAVE |
|---|---|---|---|---|---|---|---|---|---|---|
| 001 | POTATOS | 60 | 1 | 25 | 20 | 160 | 100 | ... | 100msec | MASTER |
| 002 | CANDIES | 80 | 1 | 15 | 10 | 160 | 120 | ... | 30msec | MASTER |
| 003 | CHOCOLATES | 30 | 2 | 20 | 18 | 160 | 100 | ... | 50msec | SLAVE |
| .. | .. | .. | .. | .. | .. | .. | .. | ... | .. | .. |

(c) SEQUENCE STORAGE 82e

| 1ST OPERATING CONDITION STORAGE | ⟷ | 2ND OPERATING CONDITION STORAGE |
|---|---|---|
| BAG NUMBER | ⟷ | BAG NUMBER |
| NO. OF DISCHARGE | ⟷ | NO. OF DISCHARGE |
| PRODUCT IDENTIFICATION | ⟷ | PRODUCT IDENTIFICATION |

Fig. 7A

INITIAL WINDOW

| CALL NO. | PRODUCT IDENTIFICATION |

CALL NO. SELECTION

SLAVE/MASTER

| COMBINATION WEIGHING MACHINE SETUP | BAGGING MACHINE SETUP | WEIGHT CHECKER SETUP | BOXING MACHINE SETUP | RETURN |

Fig. 7B

CALL NO. SELECTION WINDOW

SELECT CALL NO.

| CALL NO. | PRODUCT IDENTIFICATION |
| --- | --- |
| 001 | POTATOS |
| 002 | CANDIES |
| 003 | CHOCOLATES |
| : | : |

RETURN

Fig.8A

BAGGING MACHINE SETUP WINDOW

| CALL NO. | 14 | PRODUCT IDENTIFICATION |
|---|---|---|
| 001 | | POTATOS |

| CALL NO. SELECTION | BAG NUMBER | NO. OF DISCHARGE |
|---|---|---|
| MASTER | 60 | 1 |

| DELAY TIME | BAG LENGTH | BAG WIDTHH | TEMPERATURE | TIME |
|---|---|---|---|---|
| 100 | 25 | 20 | 160 | 100 |

| COMBINATION WEIGHING MACHINE SETUP | BAGGING MACHINE SETUP | WEIGHT CHECKER SETUP | BOXING MACHINE SETUP | RETURN |
|---|---|---|---|---|

BAGGING MACHINE SETUP WINDOW

| CALL NO. | 14 | PRODUCT IDENTIFICATION |
|---|---|---|
| 001 | | POTATOS |

| CALL NO. SELECTION | BAG NUMBER | NO. OF DISCHARGE |
|---|---|---|
| MASTER | 80 | 1 |

| DELAY TIME |
|---|
| 100 |

THE NUMBER OF BAGS IN THE COMBINATION WEIGHING MACHINE
IS CHANGED TO '80'.   [OK]   [NO]

| COMBINATION WEIGHING MACHINE SETUP | BAGGING MACHINE SETUP | WEIGHT CHECKER SETUP | BOXING MACHINE SETUP | RETURN |
|---|---|---|---|---|

COMBINATION WEIGHING MACHINE SETUP

| CALL NO. | 14 | PRODUCT IDENTIFICATION |
|---|---|---|
| 001 | | POTATOS |

| CALL NO. SELECTION | BAG NUMBER | NO. OF DISCHARGE |
|---|---|---|
| | 60 | 1 |

SLAVE

| DELAY TIME | TARGET WEIGHT | STRENGTH | TIME |
|---|---|---|---|
| 100 | 50 | 10 | 500 |

| COMBINATION WEIGHING MACHINE SETUP | BAGGING MACHINE SETUP | WEIGHT CHECKER SETUP | BOXING MACHINE SETUP | RETURN |
|---|---|---|---|---|

Fig.9B

COMBINATION WEIGHING MACHINE SETUP

| CALL NO. | 14 | PRODUCT IDENTIFICATION |
|---|---|---|
| 001 | | POTATOS |

| CALL NO. SELECTION | BAG NUMBER | NO. OF DISCHARGE |
|---|---|---|
| | 60 | 1 |

SLAVE

DELAY TIME
100

THE COMBINATION WEIGHING MACHINE IS SLAVE. TO CHANGE THE BAG NUMBER, SELECT THE BAGGING MACHINE SETUP.

| COMBINATION WEIGHING MACHINE SETUP | BAGGING MACHINE SETUP | WEIGHT CHECKER SETUP | BOXING MACHINE SETUP | RETURN |
|---|---|---|---|---|

WEIGHING AND PACKAGING SYSTEM

BACKGROUND OF THE INVENTION

1. Field of the Invention

The present invention relates to a weighing and packaging system in which a weighing apparatus and a packaging apparatus are run in an operatively associated relation with each other.

2. Description of the Prior Art

A weighing and packaging system has been well known, in which the combination weighing apparatus and the packaging apparatus are controlled in an operatively associated fashion. Such a weighing and packaging system is controlled according to operating conditions predefined for each marketable product The operating condition for each of the weighing and packaging apparatuses includes common parameters such as, for example, the number of bags (handling capacity) that are to be handled in a predetermined length of time, which parameters are common to those apparatuses and, hence, ought to be identical with each other. Accordingly, an operating condition collator for collating the respective operating conditions of the weighing and packaging apparatuses has been proposed in, for example, the Japanese Utility Model Publication No. 4-31564 published Jul. 29, 1992 or U.S. Pat. No. 4,780,830 issued Oct. 25, 1988. The operating condition collator disclosed in the patent publication referred to above is capable of checking the presence or absence of a mismatch between the operating conditions of those apparatuses.

However, in the prior art technique described above, in order for the common parameters to be changed, it is necessary to cause separate setting devices one for each of the apparatuses, to input the operating conditions of the same contents, requiring a complicated and time-consuming procedure.

SUMMARY OF THE INVENTION

Accordingly, the present invention has been devised to provide an improved weighing and packaging system comprising the weighing and packaging apparatuses that are controlled in an operatively associated fashion with each other, which is effective to eliminate waste in inputting the operating conditions to each apparatus and to eliminate any possible erroneous inputting to thereby render the system to be substantially free from any possible mismatch between the operating conditions.

In order to accomplish the foregoing object, the weighing and packaging system according to one aspect of the present invention includes a weighing apparatus for weighing an article and discharging an article having a predetermined weight, a packaging apparatus operatively associated with the weighing apparatus for receiving the article discharged from the weighing machine and packaging the article, and an override means for changing an operating condition of one of the weighing and packaging apparatuses automatically when an operating condition of the other of the weighing and packaging apparatuses is changed.

According to the present invention, since if one of the operating conditions is changed, the other of the operating conditions can be changed automatically, a single manipulation is sufficient to set the respective operating conditions for the weighing and packaging apparatuses to be set to the same parameter, thereby eliminating any possible wasteful inputting operation, rendering the setting to be easily accomplished and eliminating any possible erroneous inputting.

In the weighing and packaging system according to a preferred embodiment of the present invention, the weighing and packaging apparatuses have the respective operating conditions set to establish a master and slave relation with each other, and wherein the override means is operable to change automatically an operating parameter of the operating condition of one of the weighing and packaging apparatuses, which then serves as a slave machine, when an operating parameter of the operating condition of the other of the weighing and packaging apparatuses which then serves as a master machine.

By setting up the master and slave relationship for the operating conditions, the setting of the master machine will ensure altering of the setting of the slave machine.

The master and slave relation may be defined for a marketable product.

Preferably, the weighing and packaging system comprises means for determining if, when an inputting is carried out to change the operating condition of one of the weighing and packaging apparatuses, the operating condition of the other of the weighing and packaging apparatuses is to be changed, whereby when the determinin means determines that the operating condition of the other of the weighing and packaging apparatuses should not be changed, change of a setting of the operating condition of such one of the weighing and packaging apparatuses is inhibited. With this construction, the setting of one of the machines will not be altered where the setting of the other of the machines should not be altered and, therefore, there is no possibility that the respective operating conditions may represent contradictory values.

The operating condition may be an operating cycle.

A weighing and packaging system according to another aspect of the present invention includes a combination weighing apparatus for combining respective weights of articles supplied into a plurality of hoppers to determine a combination having a total weight within an allowance including a target weight and for discharging the articles of the combination from the hoppers; a packaging apparatus for receiving the articles discharged from the combination weighing apparatus and packaging such articles, said combination weighing apparatus and said packaging apparatus being operatively run at respective operating cycles which are identical with each other, and an override means for changing a parameter of the operating cycle of one of the combination weighing and packaging apparatuses when a parameter of the operating cycle of the other of the combination weighing and packaging apparatuses is changed and, as a result thereof, the respective parameters of the operating cycles of those combination weighing and packaging apparatuses come to be different from each other.

In the present invention, the term "article" is of a kind out of which when a few or a number of articles are collected and filled in a bag, a marketable product can be produced.

The term "marketable product" is intended to mean a few or a plurality of the articles filled in the bag in readiness for sake to customers.

The term "operating condition" herein used includes an operating cycle, an operating timing or a capacity.

The term "operating cycle" herein used is intended to mean the number of marketable products produced per unitary time from a few or a plurality of articles, or the cycle time of the production, which may vary depending on the kind of the marketable product produced.

The term "operating timing" herein used is intended to mean a timing with which each apparatus operates and includes a delay time from the timing at which weighing hopper is opened to the timing at which the bag is sealed with its opening closed, which time may vary depending on the kind of the article handled.

The term "capacity" is intended to mean a target weight of the article to be discharged and the size of the bag which may vary depending on the target weight.

BRIEF DESCRIPTION OF THE DRAWINGS

In any event, the present invention will become more clearly understood from the following description of a preferred embodiment thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 6 is a diagram showing contents stored in operating condition storages;

FIG. 7A is a front elevational view of a touch screen, showing an initial window displayed thereon;

FIG. 7B is a front elevational view of a touch screen, showing a call No. selection window displayed thereon;

FIGS. 8A and 8B are front elevational views of the touch screen, showing respective bagging machine setup windows displayed thereon; and FIGS. 9A and 9B are front elevational views of the touch screen, showing respective combination weighing machine set up windows displayed thereon.

DETAILED DESCRIPTION OF THE EMBODIMENT

Figure 1:
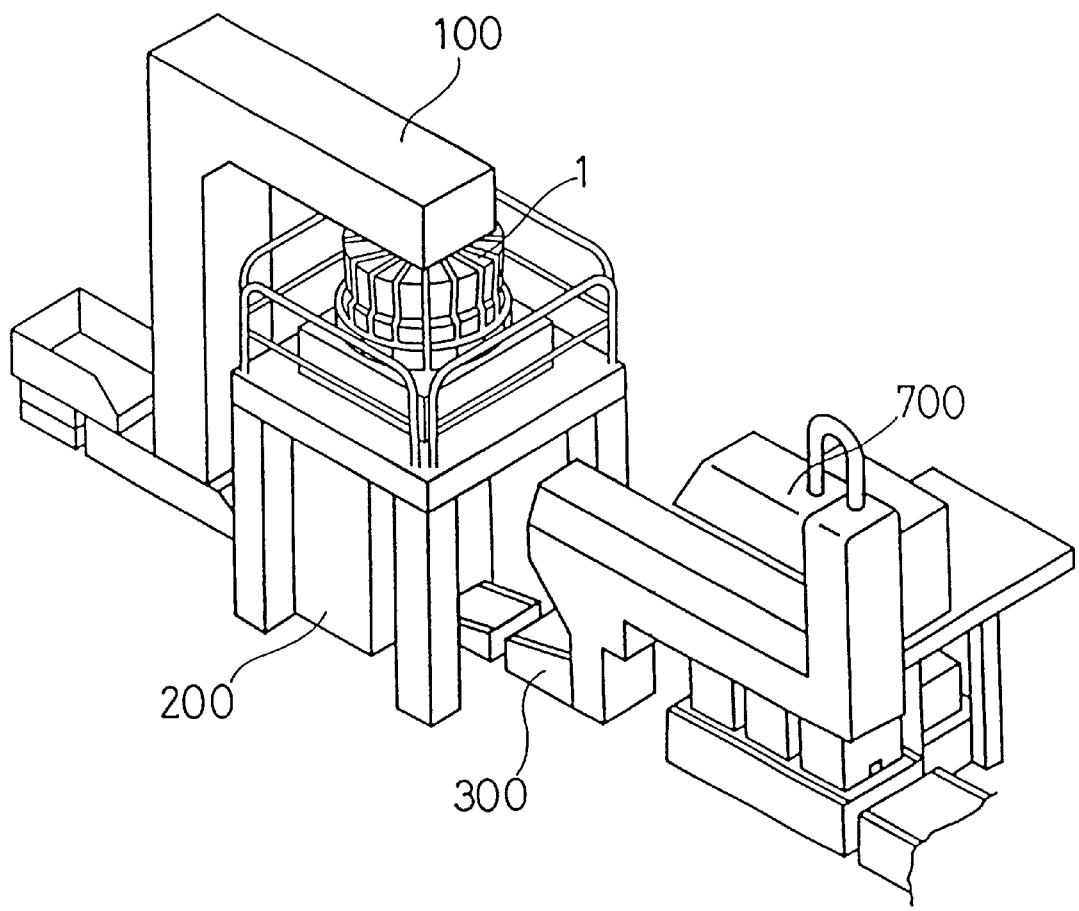
FIG. 1 is a schematic perspective view of a merchandise handling system according to one preferred embodiment of the present invention.

A merchandise handling system to which the present invention can be applied will first be described. Referring particularly to FIG. 1, the merchandise handling system shown therein comprises a transport conveyor 100, a combination weighing machine 1, a bagging machine (a packaging machine) 200, a weight checker 300, and a boxing machine 700, all operatively connected generally in series with each other from a receiving station to a merchandise delivery station.

Figure 2:
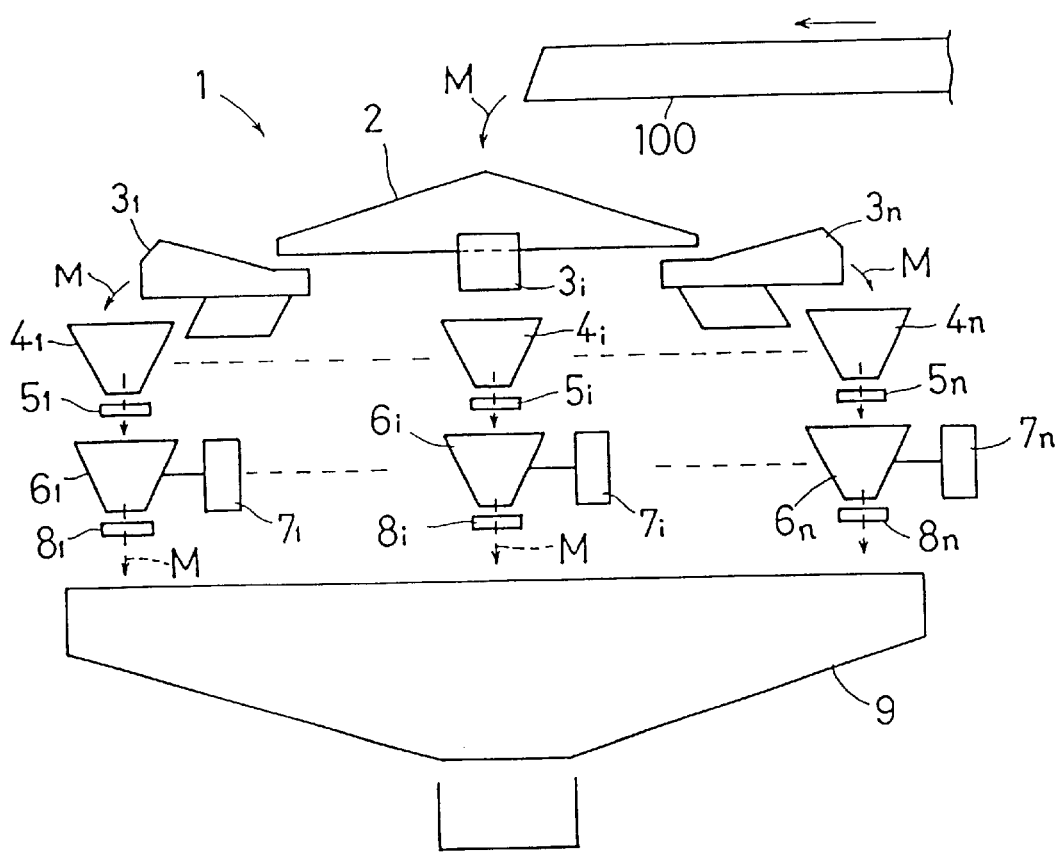
FIG. 2 is a conceptual diagram showing the function of a combination weighing machine.

FIG. 2 illustrates a conceptual diagram of the combination weighing machine 1 shown in FIG. 1. The transport conveyor 100 transports articles M, which eventually forms a content of each marketable product, towards a dispensing feeder 2 of the combination weighing machine 1 so as to fall onto a center region of the dispensing feeder 2. A plurality of pairs of supply troughs (supply device) 3i, each of which may comprise an electromagnetic feeder, are arranged adjacent and below an outer peripheral edge of the dispensing feeder 2. Both of the dispensing feeder 2 and the supply troughs 3i are so vibrated by a vibrating machine that the articles M on the dispensing feeder 2 can be dispensed towards pool hoppers 4i each disposed immediately beneath the associated supply troughs 31.

Each of the pool hoppers 4i is provided with a gate 5i and is used to accommodate and temporarily store the article M which has been supplied from the associated supply trough 3i. A weighing hopper 6i is disposed downstream of, that is, immediately beneath the associated pool hopper 4i and is provided with a weight detector 7i for detecting the weight of the article M, which has been supplied from the associated pool hopper 4i to such weighing hopper 6i, and a gate 8i. Positioned beneath the gate 8i of each of the weighing hoppers 6i is a relatively large collecting and discharging chute 9 such that by combining some of the weights of the respective articles M detected by the respective weight detectors 7i, the articles M can be discharged from the combined or selected weighing hoppers 6i and collected into a batch of articles having a total weight within an allowance including a target weight, or equal to or about equal to a target weight.

Figure 3:
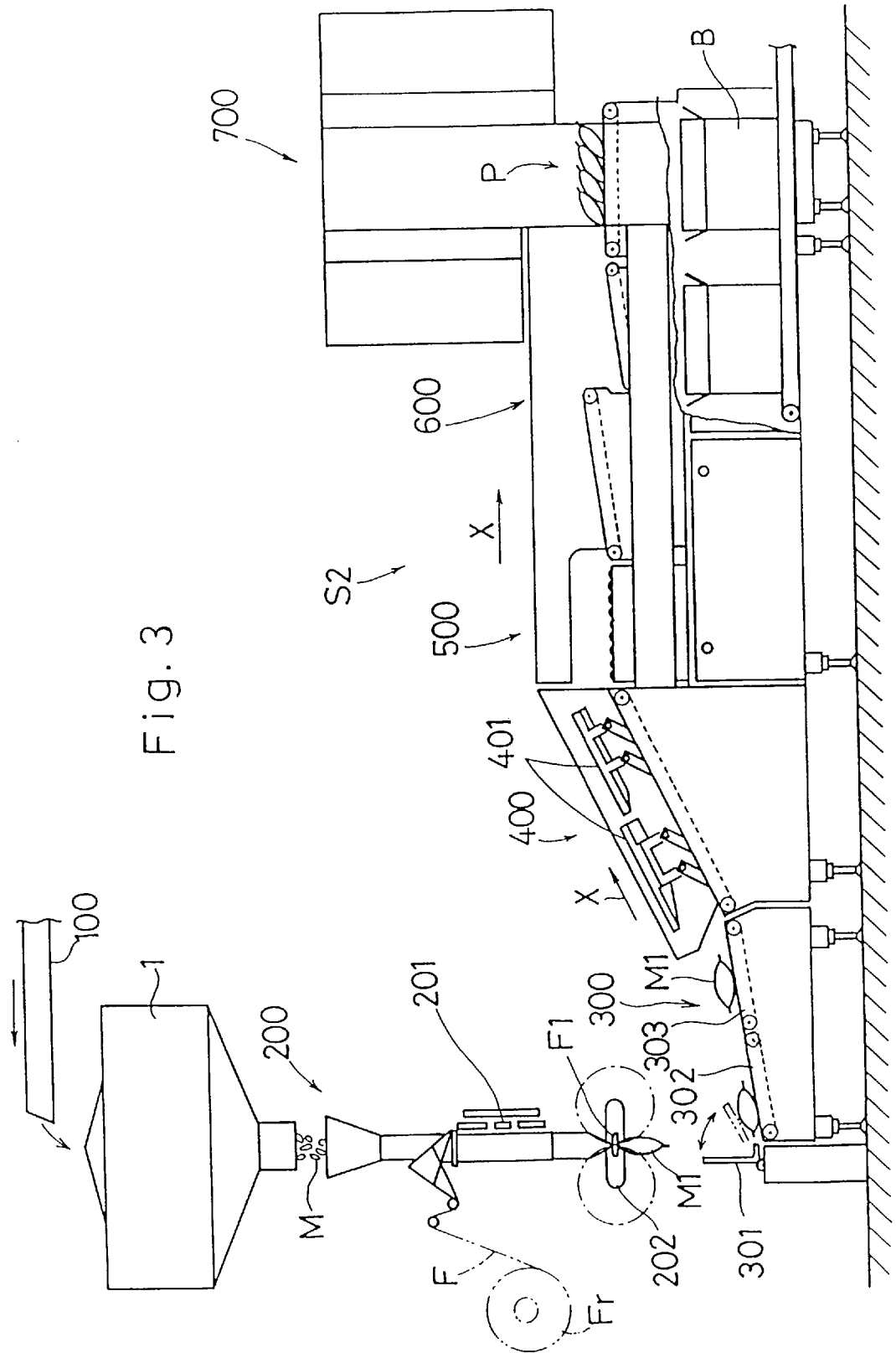
FIG. 3 is a schematic side view of the merchandise handling system.

Referring now to FIG. 3, the bagging machine 200 is a so-called vertical pillow-type bagging machine and is so operable that a strip of film F drawn from a film roll Fr can be fusion-bonded at its opposite side edges by a vertical sealer 201 to form a generally tubular film into which a batch of articles M falling by gravity from above is loaded and, thereafter, a portion of the tubular film F above the batch of the articles M can be thermally sealed and cut by an end sealer 202 to thereby provide a marketable product M1. This bagging machine 200 may be of any known construction such as disclosed in, for example, the Japanese Laid-open Patent Publication No. 4-128105 and, therefore, no further detail thereof will be reiterated for the sake of brevity.

The marketable product M1 so bagged in the manner described above falls downwards towards a delivery conveyor 302 where the marketable produce M is forced by a knock-down element 301 so as to fall flat against the delivery conveyor 302. The marketable produce M1 on the delivery conveyor 302 is then transferred from the delivery conveyor 302 onto a weighing conveyor 303 which forms a part of the weight checker 300.

The weight checker 300 serves to measure and check the weight of the marketable product MI while the latter is transported by the weighing conveyor 303 in a generally upwardly tilted fashion on the weighing conveyor 303. A seal checker 400 serves to check to see not only if the sealed bag of the marketable product M1 has any sealing defect, but also, if the length of the marketable product M1 substantially meets the required length, while the marketable produce M1 transported by the delivery conveyor 302 and the weighing conveyor 303 is, while being transported generally slantwise upwardly, suppressed from above by retainer elements 401. A sorting machine 500 is operable to reject the marketable product M1 out of the system if such marketable product M1 has been deemed unacceptable as a result of the checking performed by the weight and seal checkers 300 and 400, but to allow the marketable product M1, if deemed acceptable as a result of the checking, to be supplied further downstream towards a boxing station P.

A lineup transport apparatus 600 positioned downstream of the sorting machine 500 with respect to the direction of transport of the marketable product M1 towards the boxing machine 700 serves to line up the marketable products, successively delivered to the lineup transport apparatus 600 from the sorting machine 500, with a forward-oriented end of one marketable product M1 resting on a rearward-oriented end of the marketable product M1 placed in advance of such one marketable product M1. The marketable products M1 lined up in this fashion are successively transported towards the boxing station P.

Figure 4:
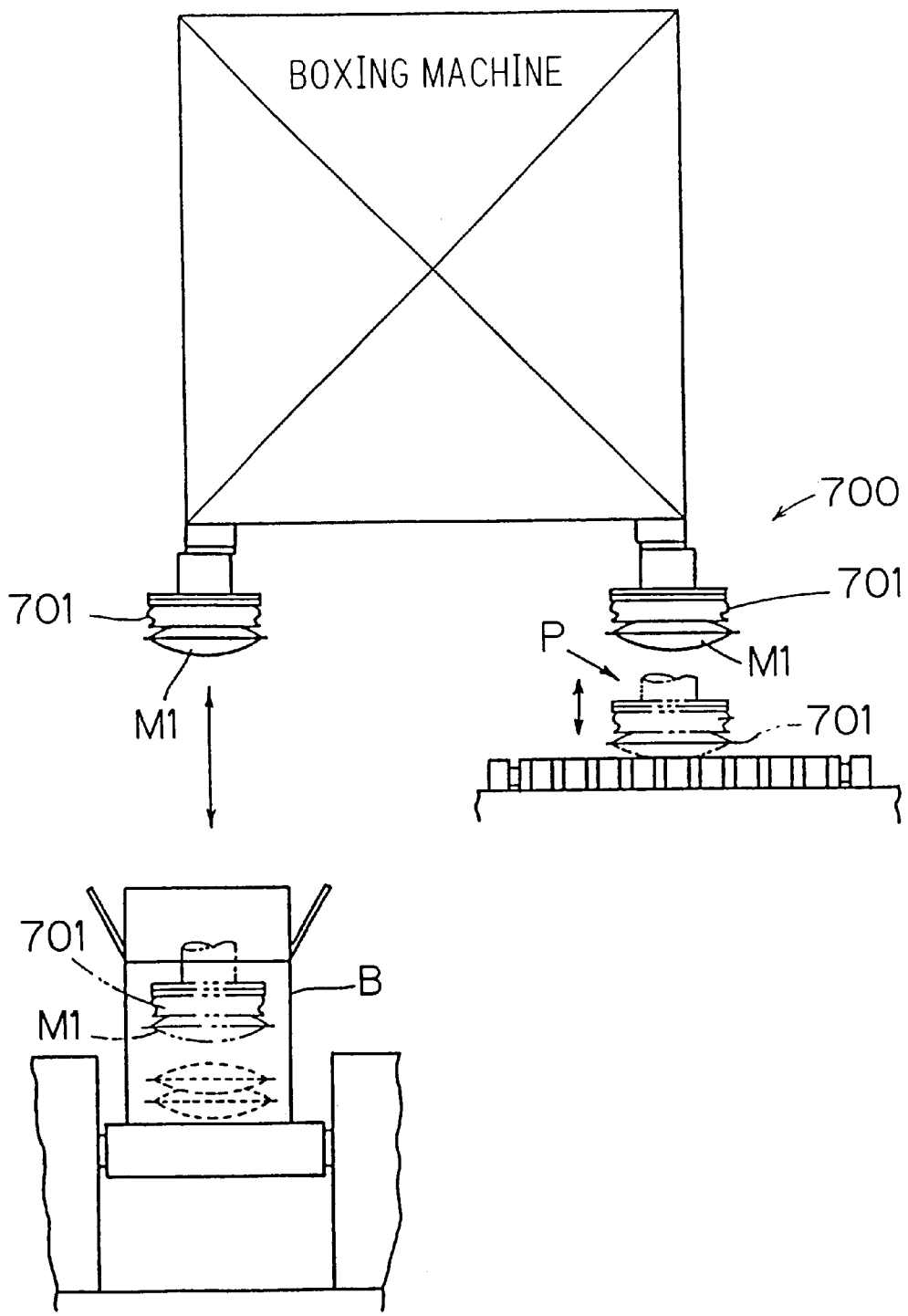
FIG. 4 is a front elevational view showing a function of a boxing machine.

The boxing machine 700 disposed at the boxing station P is best shown in FIG. 4. The boxing machine 700 includes a plurality of, for example, two suction pad assemblies 701 operable alternately to suction from above a predetermined number of, for example one marketable product M1 transported to the boxing station P, and then to transport them into a cardboard box B so as to allow the marketable products M1 to be piled up within the cardboard box B.

Hereinafter, a control system for the weighing and packaging system embodying the present invention will be described.

Figure 5:
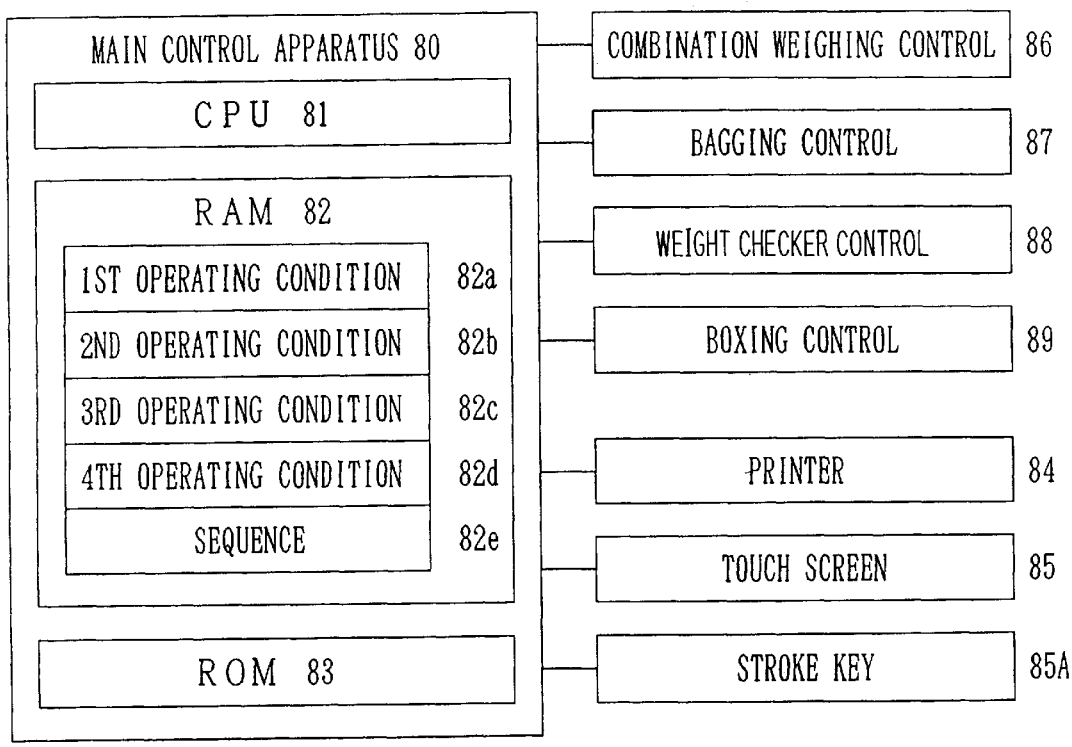
FIG. 5 is a schematic diagram showing the structure of a weighing and packaging system.

The various merchandise handling devices including the combination weighing machine 1, the bagging machine 200, the weight checker 300 and the boxing machine 700 are controlled by control units including, as shown in FIG. 5, a combination weighing control unit 86, a bagging control unit 87, a weight checker control unit 88 and a boxing control unit 89, respectively. The various control units 86 to 89 are electrically connected with a main control apparatus 80 by means of interfaces and communication means both not shown.

The main control apparatus 80 may comprise, for example, a microcomputer and includes a central processing unit (CPU) 81, a random access memory (RAM) 82 and a read-only memory (ROM) 83. The random access memory 82 comprises first to fourth operating condition storages 82a to 82d associated with the merchandise handling devices 1, 200, 300 and 700, respectively, and a sequence storage 82e.

The first operating condition storage 82a stores operating parameters associated with the combination weighing machine 1. More specifically, as shown in FIG. 6A, the first operating condition storage 82a, stores mutually linked operating parameters for the combination weighing machine 1, such as call number, article identification, number of bags (operating cycle), number of discharge (operating cycle), target weight, magnitude and time of vibration of each supply trough, delay time and so on.

The term "number of bags (or Bag No.)" referred to above means the number of the marketable products M produced (bagged) per minute and is generally called the capacity. The term "number of discharge" referred to above means the frequency of discharge of the articles M from the collecting and discharging chute 9 during the production of a single marketable product M1.

The second operating condition storage 82b stores operating parameters associated with the bagging machine 200. More specifically, as shown in FIG. 6B, the second operating condition storage 82b stores mutually linked operating parameters for the bagging machine 200, such as call number, product identification, number of bags, number of discharge, bag length, bag width, sealing temperature, sealing time, delay time and so on.

The third operating condition storage 82c shown in FIG. 5 stores operating parameters for the weight checker 300 which are mutually linked with each other. The fourth operating condition storage 82d stores operating parameters for the boxing machine 700.

The sequence storage 82e referred to above stores some of the various operating parameters shown in FIGS. 6A and 6B which are common to each other, as sequencing operating parameters as shown in FIG. 6C.

The central processing unit 81 shown in FIG. 5 controls the merchandise handling devices 101, 200, 300 and 700 through the associated control units 86 to 89 according to stored contents read out from the various operating condition storages 82a to 82d.

The operation of the weighing and packaging system embodying the present invention will now be described.

When the articles M fall onto the combination weighing machine 1 from the transport conveyor 100 in a manner known to those skilled in the art, the combination weighing machine 100 performs a combination calculating operation for the articles M according to a first operating condition (number of bags, number of discharge and target weight) for such articles M which has been read out from the first operating condition storage 82a (FIG. 6A). Then, the bagging machine 200 performs a bagging operation for the articles M, discharged and then received from the combination weighing machine 1, according to a second operating condition (number of bags, number of discharge, bag length and bag width) for such articles M which has been read out from the second operating condition storage 82b (FIG. 6B).

In this way, the combination weighing machine 1 and the bagging machine 200 are run in operatively linked fashion with each other and, therefore, the respective operating conditions under which the combination weighing machine 1 and the bagging machine 200 are operated must be matched with each other. For this reason, the system of the present invention is provided with an override control means (a touch screen 85) and a determining means (the central processing unit 81).

The main control apparatus 80 shown in FIG. 5 includes a printer 84, a touch screen (or a touch-sensitive display) 85 and a stroke key 85A. The touch screen 85 concurrently serves as a display unit for displaying various information and menu options and also an input device for inputting signals by manually pressing a portion of the displayed screen. In the practice of the present invention, the touch screen 85 is capable of displaying various information such as the number of bags, the number of discharge and so on and, also, displaying various screen buttons for setting various conditions for each apparatus as shown in FIGS. 7A to 9B.

Each of the operating condition storages 82a and 82b shown in FIG. 6 stores information of whether the combination weighing machine 1 or the bagging machine 200 is operated as a master machine or whether it is operated as a slave machine. In other words, for a particular marketable product, the combination weighing machine 1 and the bagging machine 200 have the respective operating conditions set to run under a master and slave relationship with each other. The central processing unit (determining means) 81 determines the master and slave relationship, i.e., which one of the machines 1 and 200 is run as a master machine in relation to the slave machine achieved by the other of the machines 1 and 200, from the contents stored in the operating condition storages 82a and 82b.

The manner by which the operating conditions are set will be discussed.

In the first place, by means of a predetermined manipulation on the main control apparatus 80, an initial set-up window shown in FIG. 7A is displayed on the touch screen 85 of the display. Then, when the "Call No. Selection" button 12 is finger-pressed after the "Bagging Machine Setup" button 11 has been finger-pressed, a "Call No. Selection" window shown in FIG. 7B appears on the touch screen 85. When the marketable product is selected by touching an arbitrary "Call No." button 13, for example "001" button, while the touch screen 85 displays the "Call No. Selection" window, the central processing unit 81 reads from the second operating condition storage 82b conditions for selection of the marketable product corresponding to such call number, followed by display of a bagging machine setup window (override control means) shown in FIG. 8A on the touch screen 85.

The bagging machine setup window includes a call number, operating conditions for the marketable product corresponding such call number and so on.

In this window, when the "Bag Number" is changed by touching a "Bag Number" button 14 and entering a numeral, for example "80", from the stroke key 85A, a sub-window 15 shown in FIG. 8B appears on the touch screen 85. Then, the central processing unit (determining means) 81 recognizes, by referring to the content read from the second operating condition storage 82b shown in FIG. 6B, that so long as the marketable produce associated with the specified call number is concerned, the bagging machine 200 is run as the master machine and a dialogue "The number of bags in the combination weighing machine is changed to '80'." is subsequently displayed. When in this sub-window 15 the operator press an "OK" button, the contents stored respectively in the first and second operating condition storages 82a and 82b shown in FIG. 6 are rewritten and, hence, so long as the marketable product associated with the call number "001" is concerned, the number of bags in the bagging machine 200 and the combination weighing machine 1 is changed to "80".

As discussed above, according to the system of the present invention, once the operating condition for one of the machines which serves as the master machine is changed, the operating condition for the other of the machines which then serves as the slave machine is automatically changed. Accordingly, no cumbersome and time-consuming procedure is required which would otherwise required to set the respective machines separately.

Setting from the slave machine will now be described.

When while the initial window as shown in FIG. 7A is displayed on the touch screen 85 the "Call No. Selection" button 12 is pressed after the "Combination Weigher Setup" button 10 has been pressed, a "Call No. Selection" window shown in FIG. 7B is displayed. When while this window is displayed the marketable product is selected-by pressing an arbitrary "Call No." button 13, such a combination weigher setup window as shown in FIG. 9A appears on the touch screen 85.

The combination weigher/counter setup window includes, in addition to the call number, operating conditions associated with the marketable product corresponding to such call number.

In this setup window, when an attempt is made to change the "Bag No." by pressing, for example, a "Bag No." button 14 and entering a numeral "80" through the stroke key 85A (FIG. 5), such a sub-window 15A as shown in FIG. 9B appears on the touch screen 85. The central processing unit (determining means) 81 recognizes, by referring to the content read from the first operating condition storage 82a shown in FIG. 6A, that so long as the marketable produce associated with the specified call number "001" is concerned, the combination weighing machine 1 is run as the slave machine and a dialogue "The combination weighing machine is slave. To change the bag number, select the bagging machine setup." is subsequently displayed. If the operator press a "Bagging Machine Setup" button 11 according to the displayed dialogue, the bagging machine setup window shown in FIG. 8A appears on the touch screen 85 so that the combination weighing machine 1 can be set from the master machine.

As hereinbefore described, in the system embodying the present invention, in the event that an attempt is made to change parameters of the operating condition from the slave machine, the central processing unit 81 inhibits such change of the parameters of the operating condition based on the contents stored in the first and second operating condition storages 82a and 82b and, therefore, there is no possibility that the operating conditions of these two machines 1 and 200 may mismatch with each other.

Although in the foregoing description, reference has been made to the manner in which the bag number (handling capacity) as the operating condition is changed, a similar description can equally apply to any other operating condition. In the foregoing preferred embodiment of the present invention, description has been made in connection with determination of a combination within the permissible range with the weight of the articles taken as a measured weight value. However, in the case of the articles to be weight such as, for examples, snacks and candies of a kind having slightly varying weights, the number of pieces within the permissible range may be determined and conversion of the measured weight into the number of pieces may be made so that a combination can be selected to allow the converted number of pieces to fall within the permissible range.

In addition, although in the foregoing description, the combination weighing machine 1 and the bagging machine 200 have been described as operatively associated with each other, the present invention can be equally applicable where the standard weighing machine with no combination weighing and a packaging machine are operatively associated with each other.

Moreover, although in the foregoing description, the master and slave relationship has been set up for the marketable product, it may be set up for the machine regardless of a change in the marketable product. By way of example, it is possible to set the bagging machine 200 as a master machine and the combination weighing machine 1 as a slave machine for all the marketable product.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A weighing and packaging system which comprises:
   a weighing apparatus for weighing an article and discharging an article having a predetermined weight;
   a packaging apparatus for receiving the article discharged from the weighing apparatus and packaging the article, said packaging apparatus being operatively associated with weighing apparatus; and
   an override means for automatically changing an operating condition of either the weighing or the packaging apparatus, respectively, when an operating condition of either the packaging or the weighing apparatus, respectively is changed, the operating condition including an operating cycle or a capacity.

2. The weighing and packaging system as claimed in claim 1, wherein the weighing and packaging apparatuses have the respective operating conditions set to establish a master and slave relation with each other, and wherein the override means is operable to change automatically an operating parameter of the operating condition of one of the weighing and packaging apparatuses, which then serves as a slave machine, when an operating parameter of the operating condition of the other of the weighing and packaging apparatuses which then serves as a master machine.

3. The weighing and packaging system as claimed in claim 2, wherein the master and slave relation is defined for a marketable product.

4. The weighing and packaging system as claimed in claim 1, further comprising means for determining if, when an inputting is carried out to change the operating condition of one of the weighing and packaging apparatuses, the operating condition of the other of the weighing and packaging apparatuses is to be changed, whereby when the determining means determine that the operating condition of the other of the weighing and packaging apparatuses should not be changed, change of a setting of the operating condition of such one of the weighing and packaging apparatuses is inhibited.

5. A weighing and packaging system which comprises:

a combination weighing apparatus having a plurality of hoppers for combining respective weights of articles supplied into the of hoppers to determine a combination having a total weight within an allowance including a target weight and for discharging the articles of the optimum combination from the hoppers;

a packaging apparatus for receiving the articles discharged from the combination weighing apparatus and packaging such articles, said combination weighing apparatus and said packaging apparatus being initially run at respective operating cycles which are identical with each other; and an override means for changing a parameter of the operating cycle of one of the combination weighing and packaging apparatuses when a parameter of the operating cycle of the other of the combination weighing and packaging apparatuses is changed, so that the parameters of the operating cycles of the respective combination weighing and packaging apparatuses are once again identical with each other.

* * * * *